(12) United States Patent
Kang et al.

(10) Patent No.: US 7,913,872 B2
(45) Date of Patent: Mar. 29, 2011

(54) BAFFLE UNIT

(75) Inventors: Tae Wook Kang, Hwaseong (KR); Kwangjin Park, Gunpo (KR)

(73) Assignee: Hyundai Motor Company, Seoul (KR)

( * ) Notice: Subject to any disclaimer, the term of this patent is extended or adjusted under 35 U.S.C. 154(b) by 506 days.

(21) Appl. No.: 12/018,386

(22) Filed: Jan. 23, 2008

(65) Prior Publication Data
US 2009/0134174 A1    May 28, 2009

(30) Foreign Application Priority Data

Nov. 28, 2007 (KR) .................. 10-2007-0122025

(51) Int. Cl.
*B65D 88/12* (2006.01)
(52) U.S. Cl. ........................................ 220/563
(58) Field of Classification Search ............. 220/563, 220/564, 562, 551, 530, 529, 905, 501, 549, 220/500, 581, 729, 735, 694; 206/0.6; 428/596, 428/131; 137/574; *B65D 25/04, 25/02, 25/00*
See application file for complete search history.

(56) References Cited

U.S. PATENT DOCUMENTS

| | | | | | |
|---|---|---|---|---|---|
| 2,214,330 | A | * | 9/1940 | Henderson et al. | 220/666 |
| 2,369,921 | A | * | 2/1945 | Shakesby | 220/563 |
| 2,860,809 | A | * | 11/1958 | Perry | 220/563 |
| 3,979,005 | A | * | 9/1976 | Robinson et al. | 220/560.07 |
| 4,557,876 | A | * | 12/1985 | Nutter | 261/94 |
| 6,568,556 | B1 | * | 5/2003 | Kahler et al. | 220/563 |

* cited by examiner

*Primary Examiner* — Anthony Stashick
*Assistant Examiner* — Robert J Hicks
(74) *Attorney, Agent, or Firm* — Morgan, Lewis & Bockius LLP

(57) ABSTRACT

A baffle unit is secured in a fuel tank with an inward protrusion. The baffle unit includes a first band plate and a second band plate attached to the first band plate. The band plates contact opposite surfaces of the protrusion. A support may be provided between the two band plates. A hole may be provided in at least one of the band plates. The second band plate may include a flexible member, elastically secured to the protrusion. The shape of at least one edge of at least one of the band plates may correspond to the shape of a surface of the fuel tank.

6 Claims, 2 Drawing Sheets

BAFFLE UNIT

CROSS-REFERENCE TO RELATED APPLICATION

This application claims priority to, and the benefit of, Korean Patent Application No. 10-2007-0122025, filed in the Korean Intellectual Property Office on Nov. 28, 2007, the entire contents of which are incorporated herein by reference.

BACKGROUND OF THE INVENTION (a) Field of the Invention

The present invention relates to a baffle unit provided in a fuel tank of a vehicle.

(b) Description of the Related Art

The fuel in a vehicle fuel tank strikes the inside wall of the fuel tank when the vehicle starts or stops abruptly, so a flow noise is generated.

A baffle is integrally formed with the fuel tank. Typically, the tank and baffle are made of plastic, by blow-molding. There is very little design freedom in the baffle, since the entire mold needs to be modified to make changes to the baffle.

The above information disclosed in this Background section is only for enhancement of understanding of the background of the invention and therefore it may contain information that does not form the prior art that is already known in this country to a person of ordinary skill in the art.

SUMMARY OF THE INVENTION

A baffle unit is secured in a fuel tank with an inward protrusion. The baffle unit includes a first band plate and a second band plate attached to the first band plate. The band plates contact opposite surfaces of the protrusion.

A support may be provided between the two band plates. A hole may be provided in at least one of the band plates. The second band plate may include a flexible member, elastically secured to the protrusion. The shape of at least one edge of at least one of the band plates may correspond to the shape of a surface of the fuel tank.

DETAILED DESCRIPTION OF PREFERRED EMBODIMENTS

The present invention will be described more fully hereinafter with reference to the accompanying drawings, in which exemplary embodiments of the invention are shown.

Figure 1:
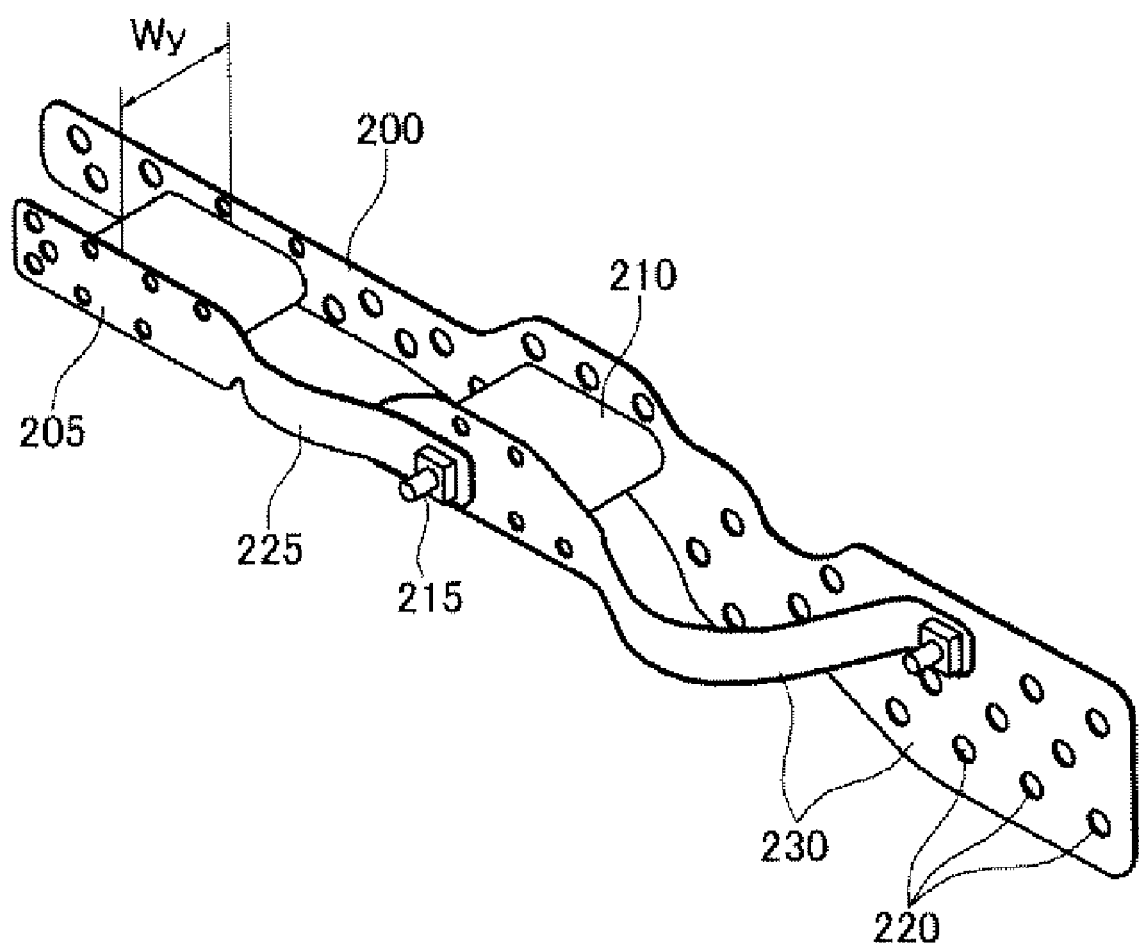
FIG. 1 is a perspective view of a baffle set according to an exemplary embodiment of the present invention.

Referring to FIG. 1, a baffle set for reducing flow noise includes a first band plate 200, a second band plate 205, a support 210, and a fixing portion 215. The first and second band plates 200 and 205 further include an extended portion 230.

Several holes are provided in the band plates 200, 205, and the fuel flows through the holes 220.

The band plates 200, 205 face each other, and the support 210 is interposed between the band plates 200, 205. A space is thus defined between the band plates 200, 205.

The support 210 and the second band plate 205 are attached together by the fixing portion 215 which, as illustrated, may be a bolt and a nut.

The second band plate 205 can also be fixed to the first band plate 200 by the fixing portion 215. The bolt and the nut may be engaged through one of the holes 220 of each band plate 200, 205.

The second band plate 205 further includes a flexible member 225 in at least one portion thereof. A space is defined between the flexible member 225 and the first band plate 200.

As shown, the extended portions 230 of the first and second band plates 200 and 205 are attached to each other. Further, at least one edge of the first and second band plates 200 and 205 traces an inside curved surface of the fuel tank 305 to reduce flowing of the fuel.

Figure 2:
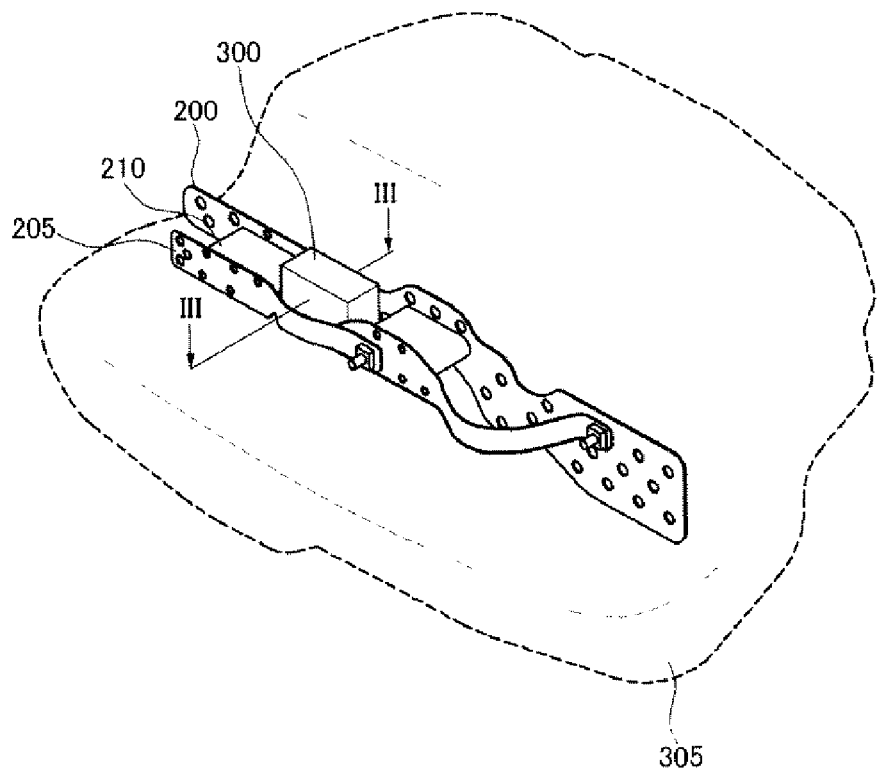
FIG. 2 is a schematic view of the baffle of FIG. 1 installed in a fuel tank.
Figure 3:
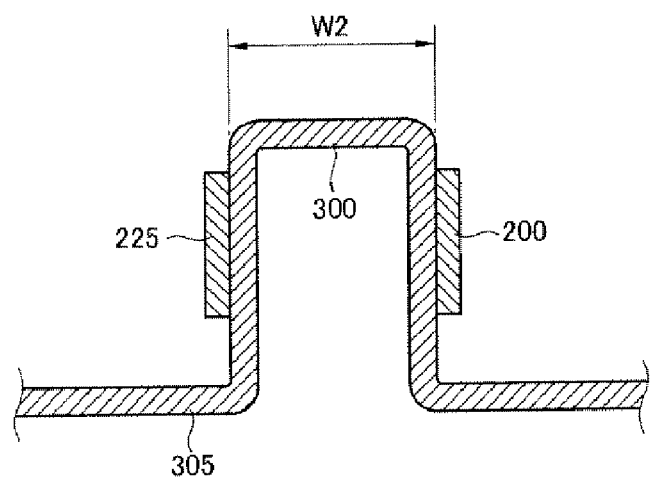
FIG. 3 is a cross-sectional view of the fuel tank of FIG. 2.

Referring to FIG. 2 and FIG. 3, a protrusion 300 is defined at an inside middle portion of a fuel tank 305, and protrudes inside of the fuel tank 305.

The baffle set is attached to the protrusion 300. As shown in FIGS. 2 and 3, the first band plate 200 contacts one side surface of the protrusion 300, and the flexible member 225 contacts the other side surface of the protrusion 300.

Referring to FIG. 1 and FIG. 3, the width W2 of the protrusion 300 is larger than the width Wy of the support 210. Accordingly, the band plates are securely fastened to the protrusion 300.

The flexible member 225 may be elastically attached to the protrusion portion 300.

The first band plate 200, the second band plate 205, the support 210, the fixing portion 215, and the flexible member 225 are made of a material that does not change material characteristics when in contact with a fuel such as gasoline.

The baffle set according to the present exemplary embodiment can be applied to several kinds of fuel tanks. Further, it is not necessary to keep in mind the design of the baffle set when making the fuel tank, so manufacturing cost of the fuel tank is reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A baffle unit configured to be secured in a fuel tank comprising an inward protrusion formed inside the fuel tank, the baffle unit comprising:
   a first band plate;
   a second band plate parallel to the first band plate with a predetermined gap therebetween;
   wherein the first and second band plates are respectively attached to opposite surfaces of the inward protrusion disposed between the first and second band plates; and
   wherein the inward protrusion protrudes inside of the fuel tank;
   a support disposed between the first and second band plates and attached to the first and second band plates; and
   a hole formed in at least one of the first and second band plates;
   wherein the second band plate includes a flexible member elastically secured to the inward protrusion.

2. The baffle unit of claim 1, wherein a shape of at least one edge of at least one of the first and second band plates corresponds to a shape of a surface of the fuel tank.

3. The baffle unit of claim 1, wherein the second band plate includes an extension portion connecting the flexible member to one end of the first band plate.

4. The baffle unit of claim 3, wherein the first band plate includes an extension portion.

5. The baffle unit of claim 4, wherein the extension portions of the first and second band plates are coupled each other.

6. The baffle unit of claim 1, wherein a fixing portion penetrates the first band plate, the support and the second band plate.

* * * * *